US008644451B2

(12) United States Patent
Aoki et al.

(10) Patent No.: US 8,644,451 B2
(45) Date of Patent: Feb. 4, 2014

(54) X-RAY GENERATING APPARATUS AND INSPECTION APPARATUS USING THE SAME THEREIN

(76) Inventors: Shozo Aoki, Ome (JP); Masahiro Nonoguchi, Tachikawa (JP)

( * ) Notice: Subject to any disclaimer, the term of this patent is extended or adjusted under 35 U.S.C. 154(b) by 149 days.

(21) Appl. No.: 13/131,611

(22) PCT Filed: Mar. 26, 2010

(86) PCT No.: PCT/JP2010/002201
§ 371 (c)(1),
(2), (4) Date: May 27, 2011

(87) PCT Pub. No.: WO2010/109909
PCT Pub. Date: Sep. 30, 2010

(65) Prior Publication Data
US 2011/0235781 A1 Sep. 29, 2011

(30) Foreign Application Priority Data
Mar. 27, 2009 (JP) ................................ 2009-078590

(51) Int. Cl.
*H01J 35/18* (2006.01)
*G01N 23/04* (2006.01)

(52) U.S. Cl.
USPC ............................................ 378/62; 378/140

(58) Field of Classification Search
USPC ........................... 378/62, 140, 144, 124, 143
See application file for complete search history.

(56) References Cited

U.S. PATENT DOCUMENTS

2006/0153337 A1* 7/2006 Holland et al. ............... 378/144

FOREIGN PATENT DOCUMENTS

| | | |
|---|---|---|
| JP | 06-188092 | 7/1994 |
| JP | 2003-014894 | 1/2003 |
| JP | 2005-158474 A | 6/2005 |
| JP | 2005158474 A * | 6/2005 |
| JP | 2006-017653 | 1/2006 |
| JP | 2006-222031 A | 8/2006 |
| JP | 2008-545981 | 12/2008 |
| JP | 2009-195349 | 9/2009 |
| WO | WO 2006/003727 A1 | 1/2006 |

* cited by examiner

*Primary Examiner* — Irakli Kiknadze
(74) *Attorney, Agent, or Firm* — Antonelli, Terry, Stout & Kraus, LLP.

(57) ABSTRACT

An X-ray generating apparatus is disclosed which includes a tube body having a vacuum interior, an electron source provided within the tube body to generate an electron beam, a target, within the tube body that is irradiated with the electron beam to generate an X-ray, and an X-ray window for taking out the X-ray generated outside of the tube body. A plurality of grooves are formed on a surface of a member building up the target. The grooves each have a fine width and are inclined by a predetermined angle (α), from a direction perpendicular to an elongating direction of the grooves, so that they bridge over the plural numbers of grooves. The X-ray generating apparatus is configured such that a multi-line X-ray generating from the plural numbers of multi-line targets, which are formed between the grooves, emits at a predetermined extraction angle (β), passing through the X-ray window. An inspection apparatus which includes the X-ray generating apparatus is also disclosed.

7 Claims, 11 Drawing Sheets

X-RAY GENERATING APPARATUS AND INSPECTION APPARATUS USING THE SAME THEREIN

TECHNICAL FIELD

The present invention relates to an X-ray generating apparatus for irradiating X-ray therefrom, and in particular, it relates to an X-ray generating apparatus for enabling to emit a stripe-like X-ray (or, multi-line X-ray) therefrom, as well as, an inspection apparatus applying the same therein.

Apparatuses applying the X-ray therein are used, widely, for the purposes of analysis or explication of an object (a sample), and further an inspection thereof, etc., in various technical fields. As an X-ray source in such the apparatuses is applied, though differing from depending on a way of use thereof, etc., one for irradiating stripe-like X-ray (or, multi-line X-ray) therefrom, as well as, a normal point-like X-ray source.

For example, in the following Patent Document 1 is already known an X-ray source, wherein an object, upon which charged particles strike, has a means for achieving a converging/diverging effect of radiation, such as, being made of a zone plate, for example, for enabling the X-ray generated to converge on that spot.

PRIOR ART DOCUMENTS

<Patent Documents>

[Patent Document 1] Japanese Patent Laying-Open No. 2006-17653 (2006).

SUMMARY OF THE INVENTION

Problem(s) to be Dissolved by the Invention

By the way, in general, for producing such stripe-like X-ray (multi-line X-ray), it can be considered to dispose a transmission-type diffraction grating in a front of the X-ray source, but in actual, there can be assumed that the stripe-like X-ray (or, multi-line X-ray) having a size of micrometer (μm) order (e.g., line width) is required, depending on the way of use thereof; however, with the conventional technology, it is difficult to obtain such the stripe-like X-ray.

This is because, since an attenuation of the X-ray cannot be made down to zero (0) in a region where the X-ray can easily passes through, with such the transmission-type diffraction grating or a Fresnel zone plate, which can be found in the Patent Document mentioned above, therefore it difficult to obtain the stripe-like X-ray (multi-line X-ray) having a high aspect ratio between the X-ray transmission region and the X-ray absorption region, i.e., being high in the contrast thereof.

Then, according to the present invention, by taking the problem(s) in the conventional art mentioned above into the consideration thereof, i.e., it is an object thereof is to provide an X-ray generating apparatus for enabling to produce the stripe-like X-ray (multi-line X-ray) having a desired size (e.g., the line width), and an inspection apparatus applying therein the stripe-like X-ray (multi-line X-ray) being high in the contrast thereof, which can be obtained therefrom.

Means for Dissolving the Problem(s)

For accomplishing the objection mentioned above, according to the present invention, first of all, there is provided an X-ray generating apparatus, comprising: a tube body, which is constructed to be vacuum in an inside thereof; an electron source, which is provided within said tube body to generate an electron beam therefrom; a target, which is provided within said tube body and irradiated with the electron beam emitting from said electron source, thereby to generate an X-ray therefrom; and an X-ray window, which is provided for taking out the X-ray generated into an outside of said tube body, wherein on a surface of a member building up said target are formed plural numbers of grooves, each having fine width, repetitively, thereby irradiating the electron beam from said electron source, inclining by a predetermined angle, from a direction perpendicular to an elongating direction of said grooves, so that they bridge over said plural numbers of grooves, and also a multi-line X-ray generating from the plural numbers of multi-line targets, which are formed between said grooves, emits at a predetermined extraction angle, passing through said X-ray window.

Also, according to the present invention, in the X-ray generating apparatus described in above, it is preferable that an element of a low atomic number is filled up within an inside of said grooves, or an element of a low atomic number is coated on interior surfaces of said grooves. Or, in the X-ray generating apparatus described in the above, said target is a static-type target, or a rotary-type target.

And, according to the present invention, there is further provided an inspection apparatus, comprising: an X-ray generating apparatus, which is described in the above; and an X-ray detecting means for detecting an X-ray image, which can be obtained by irradiating the multi-line X-ray emitted from said X-ray generating apparatus, upon an inspection object, and in particular, said inspection object is a transmission-type 1-dimensional grating.

Effects of the Invention

As was mentioned above, according to the present invention, there can be provided the X-ray generating apparatus for enabling to forma very fine width stripe-like X-ray (i.e., the multi-line X-ray) having a size (e.g., line width) of μm order, and there can be also obtained a very superior effect of providing an inspection apparatus for enabling to achieve the structure of a very fine width, such as, a transmission-type 1-dimensional grating or the like, for example, with simple elements, with using such the fine width stripe-like X-ray (i.e., the multi-line X-ray).

EMBODIMENT(S) FOR CARRYING OUT THE INVENTION

Hereinafter, embodiments according to the present invention will be fully explained by referring to the attached drawings.

Figure 1:
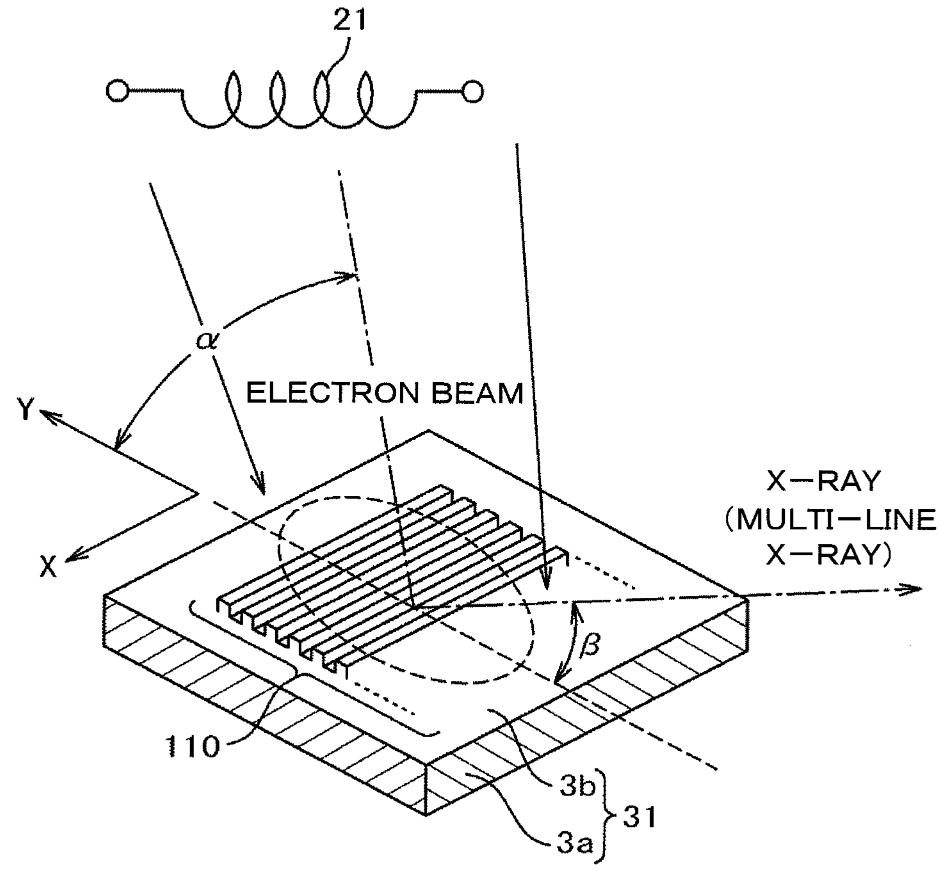
FIG. 1 is a view for explaining the principle of a multi-line target within an X-ray generating apparatus (e.g., an X-ray tube), according to the present invention.

First of all, explanation will be given on an X-ray generating apparatus, according to the present invention, mainly, about the principle thereof. First, FIG. 1 attached herewith shows essential parts for building up the X-ray generating apparatus, according to an embodiment of the present invention. In this figure, firstly, a reference numeral 3*b* depicts a metal target, which is provided on the surface of a target member 31 made of a metal plate, forming or defining plural numbers of grooves 110 . . . thereon, each having minute or very fine width. Thus, between those plural numbers of grooves 110 . . . , there are also defined line-like targets, each having very fine width thereof. Further, this metal plate is made of, for example, copper (Cu) or molybdenum (Mo), and on the surface thereof are formed or defined the grooves 110, each having width (W) and depth (D), at a pitch (P), extending in a X-axis direction in the figure, and repeating in Y-direction, continuously.

Upon the surface of the metal target 3*b* mentioned above are irradiated electron beams, emitting from an electron gun (e.g., a filament) 21, which builds up an electron source. However, this electron gun 21 is disposed at such a position, in the above of the metal target 3*b*, that the electron beam can enters on the target surface, being inclined by a predetermined angle "α", in the direction perpendicular to the direction (e.g., a Y-axis in the figure), into which those plural numbers of very fine grooves 110 . . . are formed (e.g., the X-axis direction). As a result thereof, the electron beam, irradiating from this electron gun 21 (being converged by an electron lens, depending on the necessity thereof), enters upon the surface of the metal target 3*b* mentioned above, bridging over the plural numbers of grooves 110, each having the very fine width thereof, while being inclined by the predetermined angle "α". However, the angle "α" may be 90°, similar to that of a normal X-ray tube.

Figure 2:
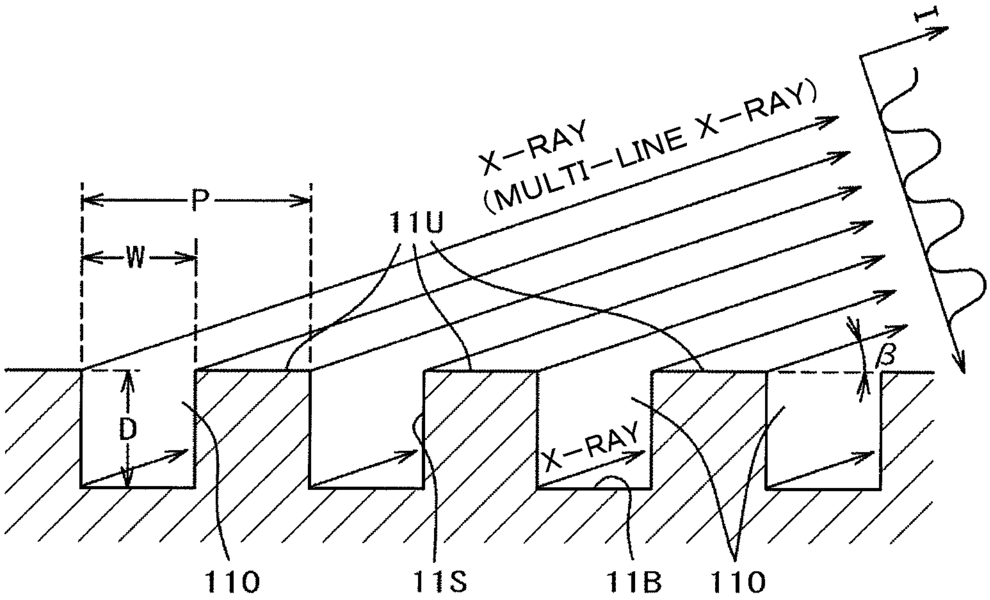
FIG. 2 is a partial enlarged cross-section view for explaining the principle of the multi-line target mentioned above.

And, with the structures having such metal target 3*b* as was mentioned above, the X-ray can be taken out by an extraction angle "β", in the Y-axis direction in the figure, at that instance, as is shown in FIG. 2, though the X-ray irradiating from a line-like target surface (e.g., the line-like target) 11U defined between the grooves 110 emits as it is, at the extraction angle "β", on the surface of the metal target 3*b* mentioned above, however, on the other hand, the X-rays irradiating from portions other than that, in more details, a bottom surface 11*b* of the groove 110 is reduced or attenuated on a side surface 11S thereof. As a result thereof, in the direction of extraction angle "β" mentioned above, there can be obtained that X-ray increasing/decreasing the intensity (I) thereof, periodically, i.e., the stripe-like X-ray (the multi-line X-ray).

However, herein, the distance (e.g., the pitch: P) between the grooves 110 and the width (W) and also the depth (D) are so determined, i.e., P=2W, for example; however, according to the present invention, they should not be limited to this, and may be P≠2W. Also, the depth (D) of the grooves, which are formed on the surface of the metal target 3*b*, is determined to be enough for attenuating the E-ray irradiating from the bottom surface 118 in the depth thereof (D>W·tan β).

Also, in the left-hand side of FIG. 2 mentioned above, there is shown a distribution of intensity of the multi-line X-ray, which can be obtained in the manner mentioned above, and as is apparent from this, it can be seen that the intensity of X-ray changes, continuously, while increasing/decreasing periodically in the direction perpendicular to the direction of the stripes (lines). And, line width of the multi-line X-ray, which can be obtained with this, comes to D·sin β. In other words, the line width of the multi-line X-ray with such structure as was mentioned above can be obtained by determining the distance (D) between the grooves 110, which are formed on the surface of the metal target, and the extraction angle (β) of the X-ray at appropriate values thereof, and in particular, with forming the grooves 110 having very fine width formed on the surface of the metal target 3*b*, at the distance (D) of an order of several tens μm, it is possible to obtain the stripe-like X-ray (multi-line X-ray) having a size of μm order, easily.

The intensity distribution "I" shown in the above presents the intensity of generation of the X-ray from an X-ray generating plane on the target surface. In other words, in the vicinity very close to the target surface, the distribution of X-ray intensity in the direction of the extraction angle (β) of the X-ray comes to be one having the stripe-like contrast, reflecting the intensity of generation of the X-ray. In this manner, a gist of the present invention lies in that the intensity distribution on an X-ray generating portion has the stripe-like contrast when seeing the X-ray generating plane into the extraction angle (β) of the X-ray.

The stripe-like X-ray irradiating from the X-ray generating portion according to the present invention, since each stripe thereof is irradiated, while diverging respectively, therefore, in general, it can be easily imagined that the X-ray has a uniform and flat distribution, if X-ray photographing is conducted at the position far from the X-ray generating portion by a long distance.

The fact mentioned above is a reason why no motivation is made for the present invention in the conventional technology. However, the inventors, etc., of the present invention found out that the intensity distribution never be flat one, since it reflects the intensity contrast of the X-ray generating portion if disposing a diffraction grating in a part of such an optical path.

Thus, in accordance with the structure of the metal target 3*b* mentioned above, according to the present invention, it is enough that the metal target 3*b*, upon the surface of which the electron beams radiating from the electron gun (i.e., the filament) 21 are irradiated, is constructed, in such that the line-like targets 11B are aligned, periodically and continuously, in particular, on the surface thereof, and in the explanation, which will be given hereinafter, the target having such structure will be called, simply, by "multi-line target 100".

However, in the explanation given in the above, it is explained that the metal target 3*b* (=multi-line target 100) is obtained by forming the plural numbers of grooves 110 . . . on the surface of a metal film; however, as is apparent from the principle of the present invention mentioned above, according to the present invention, it is not always necessary to form the plural numbers of grooves 110 . . . , and for example, in the place of the grooves mentioned above, by forming the plural numbers of the grooves through forming plural numbers of line-like metal members on the surface of a metal plate (includes embedding, etc.), it is also possible to obtain the similar effect.

Hereinafter, explanation will be given on a variation of the multi-line target 100 mentioned above, by referring to FIGS. 3A-3D and FIGS. 4A and 4B attached herewith.

Figure 3A:
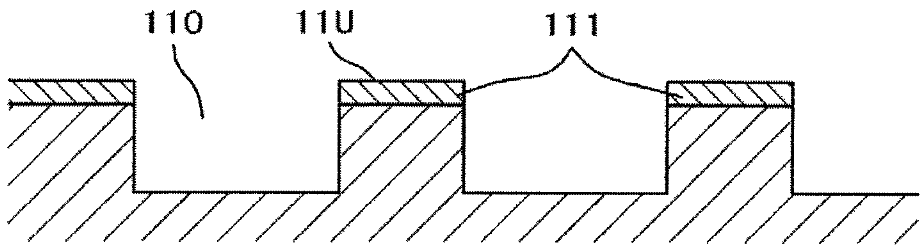
FIGS. 3A through 3D are cross-section views for explaining about variations of the multi-line target mentioned above.
Figure 3B:
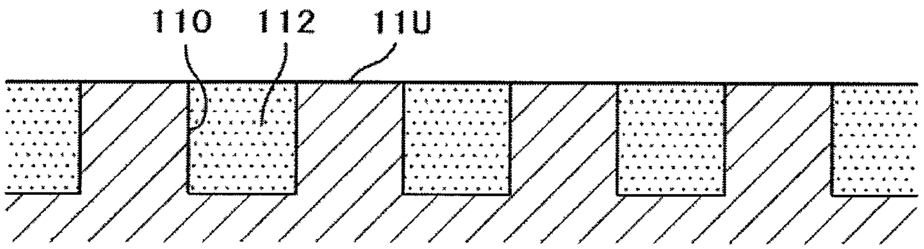
Figure 3C:
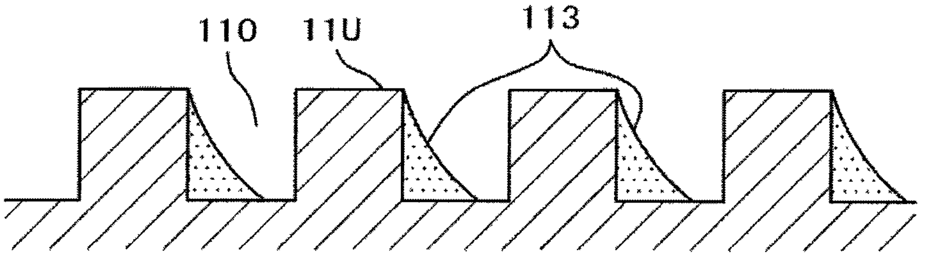
Figure 3D:
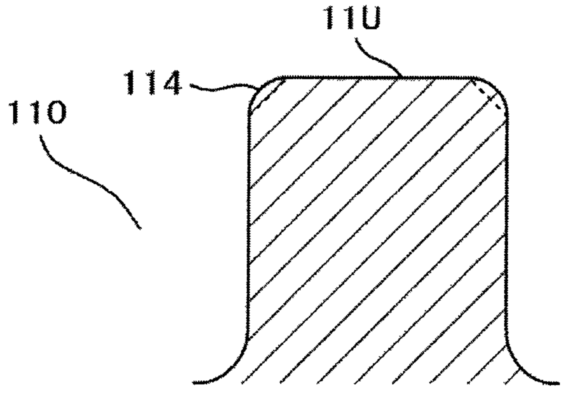

FIG. 3A shows one, for example, obtained by forming layers 111 of molybdenum (Mo) or tungsten (W) on the surface (e.g., an upper surface) 11U of a target member 31 of copper (Cu), after forming the plural numbers of grooves 110 . . . on the surface thereof, thereby obtaining a Mo characteristic X-ray, a W characteristic X-ray or a continuous X-ray. However, in the example shown in FIG. 3A, the plural numbers of grooves may be formed on the surface of the target member, after forming the layer of molybdenum (Mo) or tungsten (W) on the surface (the upper surface) of the target member 31 of copper (Cu), thereby obtaining the line-like target 3*b*. Also, as shown in FIG. 3B, an inside of the groove 110 mentioned above may be filled up with an element having a low atomic number, such as, carbon (C), etc., for example, or as shown in FIG. 3C, on a side surface thereof may be formed a coating 113 of the element having the low atomic number. Further, as shown in FIG. 3D, an edge portion of each groove 110 may be shaped to be curved or taper-like in the cross-section thereof (shown by a dotted line in the figure), thereby adjusting the contrast of the multi-line X-ray, which can be obtained therefrom.

Figure 4A:
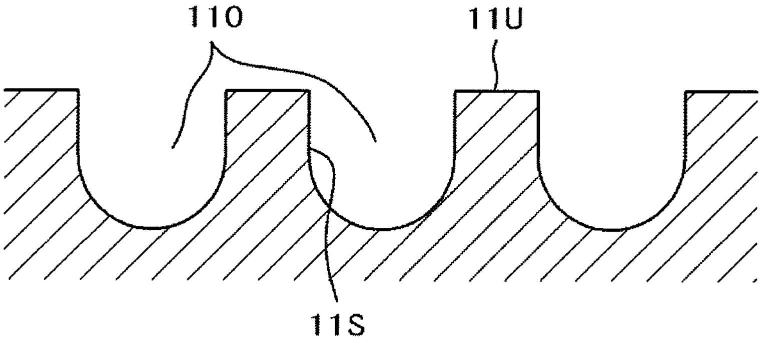
FIGS. 4A and 4B are cross-section views for explaining about other variations of the multi-line target mentioned above.
Figure 4B:
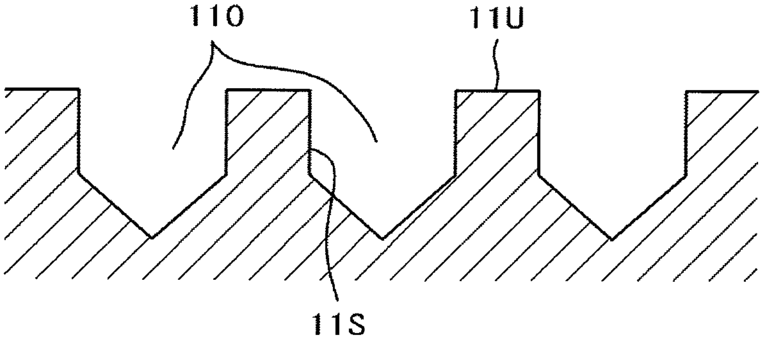

In addition thereto, the cross-section of the groove 110 may be shaped, further, into a "U" like as shown in FIG. 4A attached herewith, or "V" like as shown in FIG. 4B, in addition to the rectangular shape mentioned above. And, within or on the side surfaces 11S thereof, there may be filled up with the element having the low atomic number, or may be formed the coating thereof.

Figure 5:
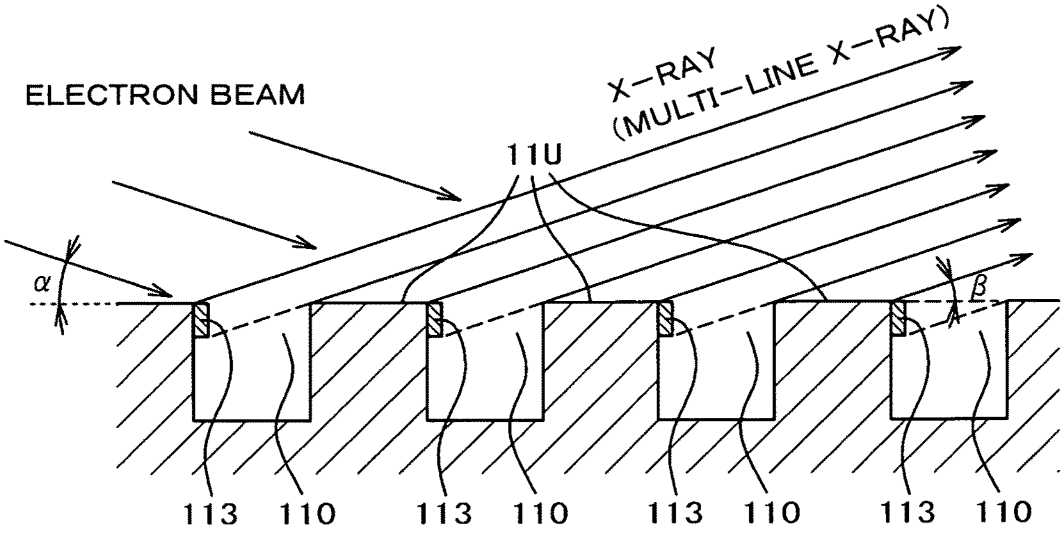
FIG. 5 is a cross-section view for explaining about further other variation, in particular, in case of small $\alpha$.

Further, the electron beams, which are emitted from the electron gun (i.e., the filament) 21 and irradiated upon the surface of the metal target 3*b* mentioned above, are incident thereupon, inclining by a predetermined angle α (=84° or so), normally; however, this inclination angle α may be set or determined at various values other than this, i.e., this inclination angle α may be also made small down to 6° or so, for example, as is shown in FIG. 5 attached herewith. However, also in this instance, it is possible to obtain the multi-line X-ray, having high contrast ratio and being preferable, by applying the coating 113 of the element of the low atomic number, in a part of an inner wall of the groove 110 mentioned above (in this example, an upper end portion on the inner wall at the left-hand side inner wall of that groove), which can be seen from a direction of taking up the X-ray (in the figure, the right-hand side).

Following to the above, explanation will be made hereinafter, on the details of embodiments, applying the X-ray generating apparatus, the principle of which was explained in the above, into actual X-ray generating apparatuses.

Embodiment 1

Figure 6:
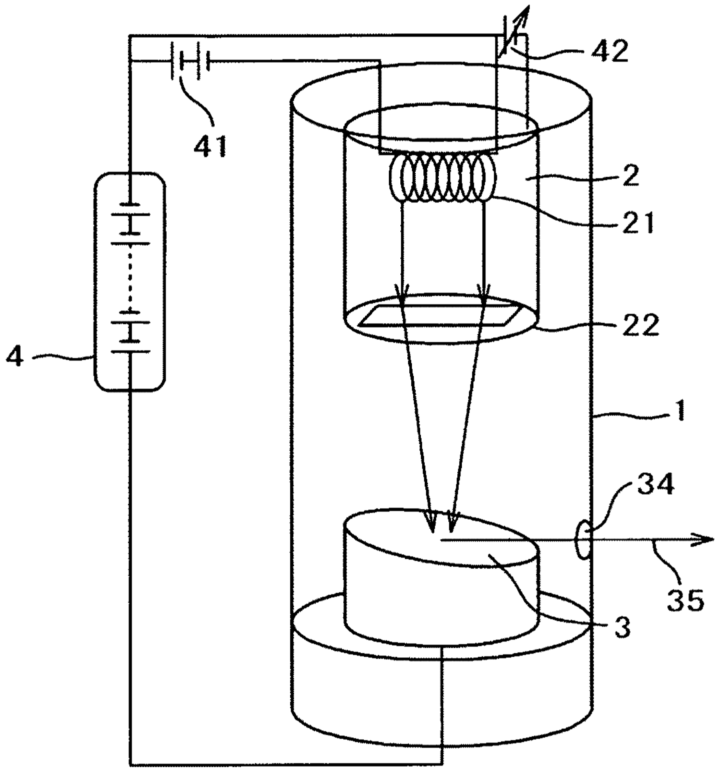
FIG. 6 is a perspective view for showing the entire structures of an X-ray generating apparatus (of an embodiment 1) having a static metal target, applying the multi-line target mentioned above therein.

FIG. 6 attached herewith is a perspective view for showing an enclosure type X-ray generating apparatus having a static metal target therein, and FIG. 6 attached herewith is a partial enlarged cross-section view thereof, including that metal target therein.

Namely, in the structure of the X-ray generating apparatus according to this embodiment 1, an electron source 2 and an anode (e.g., a target) are provided within an inside of a body of an X-ray tube, which is made of stainless steel. Further, the electron source 2 is so constructed that it comprises a filament, building up so-called a cathode, being heated by current supplied from a filament current source 41, and thereby for emitting thermo electrons (e.g., the electron beam) therefrom, and an electron lens 22 for converging the electron beams emitted into a desired diameter. However, this electron lens 22 is not always necessary, according to the present invention, but it is enough that, as was mentioned above, the electron beam emitted can irradiate on the multi-line target formed on the surface of the target, bridging over the plural numbers of the line-like target members. Also, a reference numeral 42 in the figure depicts a bias voltage, and a reference numeral 4 depicts a high-voltage electric power source for applying high-voltage between the filament 21 and the anode 3. Also, the anode mentioned above is constructed with a base member 3*a* and the metal target 3*b* building up the multi-line targets thereon, as well as, the target member 31.

With such structure as was mentioned above, the thermo electrons (the electron beam) emitting from the filament 21 building up the cathode is irradiated on the anode (the target) 3, and as a result thereof, the X-rays generating from the surface of the metal target 3*b*, which builds up the multi-line target 100 mentioned above, at the extraction angle (β), are emitted into an extraction window 34 for the X-ray, and therefore the plural numbers of stripe-like X-rays (multi-line X-ray) can be taken out from the X-ray generating apparatus to be used.

Figure 7:
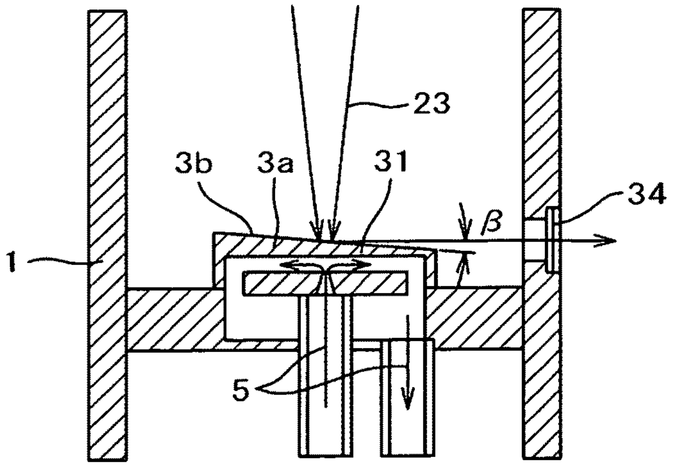
FIG. 7 is a partial cross-section view for showing the structures of periphery of the target, within the X-ray generating apparatus shown in FIG. 5 mentioned above.

Furthermore, on the anode (the target) 3 mentioned above, in more details thereof, as is shown in FIG. 7 attached herewith, there are formed the metal targets 3*b*, being as the multi-line target mentioned above, by forming the plural numbers of line-like members (the multi-like target) of molybdenum (Mo), gold (Au), silver (Ag), tungsten (W), nickel (Ni) or chromium (Cr), etc., on the surface of the base member 3*a*, being made of a metal having high thermal conductivity, such as, copper (Cu: thermal conductivity=0.94 cal/cm·sec·deg), for example, with thickness of about several tens μm and at the predetermined pitch (distance). Further, as this predetermined pitch (distance), it may be several tens μm or less or more than that. And, on the target 3 mentioned above, also in case of applying a copper material having the high thermal conductivity as the base member 3*a* thereof, and forming a tungsten film on the surface in the structure thereof, it is possible to form the metal target 3*b* having the multi-line target mentioned above, by forming (or embedding) the line-like members, being also made of molybdenum (Mo), gold (Au), silver (Ag), tungsten (W), nickel (Ni) or chromium (Cr), etc., for example, and each having thickness and width of about several tens μm, on the surface thereof, repetitively, at the predetermined pitch (distance: D).

Figure 8:
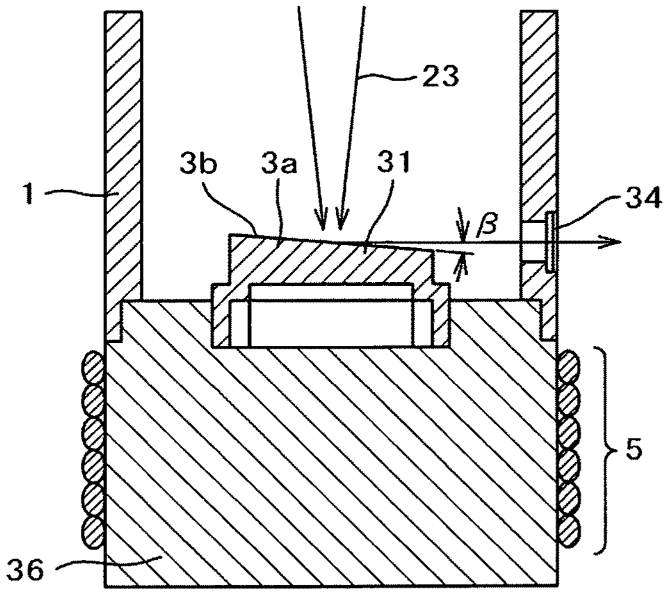
FIG. 8 is a partial cross-section view for showing the structures of peripheries of the target, within a variation of the X-ray generating apparatus shown in FIG. 5 mentioned above.

In addition thereto, on a reverse surface of the base material 3*a* of the target 3 mentioned above, as is shown in FIG. 7, there is provided a flow path for running a coolant (for example, cooling water) therein, i.e., being so constructed that heart generating in the base member 3*a* can be removed into an outside. However, for the purpose of removal of this heat, other than a method shown in the figure, i.e., cooling the reverse surface of the base member 3*a* of the target, directly, by the coolant, it is also apply a method, as is shown in FIG. 8 attached herewith, i.e., removing the heat from the base member $3a$ of the target, by means of the coolant 5 flowing within a pipe, which is would round a heat conductive ceramics 36, while conducting it to the ceramics provided in a lower portion of the base member $3a$ of the target.

However, according to the present embodiment 1, since on the surface of the base member $3a$ of the target 3 are formed the metal targets $3b$, on the surfaces of which are formed the multi-line targets 100 mentioned above, the multi-line X-ray can be taken out, of the characteristic X-ray depending on the kind of the metal, from the extraction window 34 for the X-ray, upon irradiation of the electron beams thereon. Moreover, the characteristic X-ray is already determined, depending on each metal; for example, the characteristic X-ray (Kα) of 8.04 keV can be taken out when applying copper (Cu), being same to that of the base member $3a$, or the characteristic C-ray (Kα) of 17.4 keV of molybdenum (Mo), when applying molybdenum.

Thus, with the enclosure type X-ray generating apparatus mentioned above, having the static metal target, according to the embodiment 1, it is possible to obtain easily, the plural numbers of stripe-like X-rays (the multi-line X-ray), each having a size (i.e., the line width) desired in μm order, by determining the width (W) and/or the pitch (distance: D) of the line-like member, and the metal for forming the multi-line target mentioned above as well, and further the extraction angle (β), appropriately.

Embodiment 2

Figure 9:
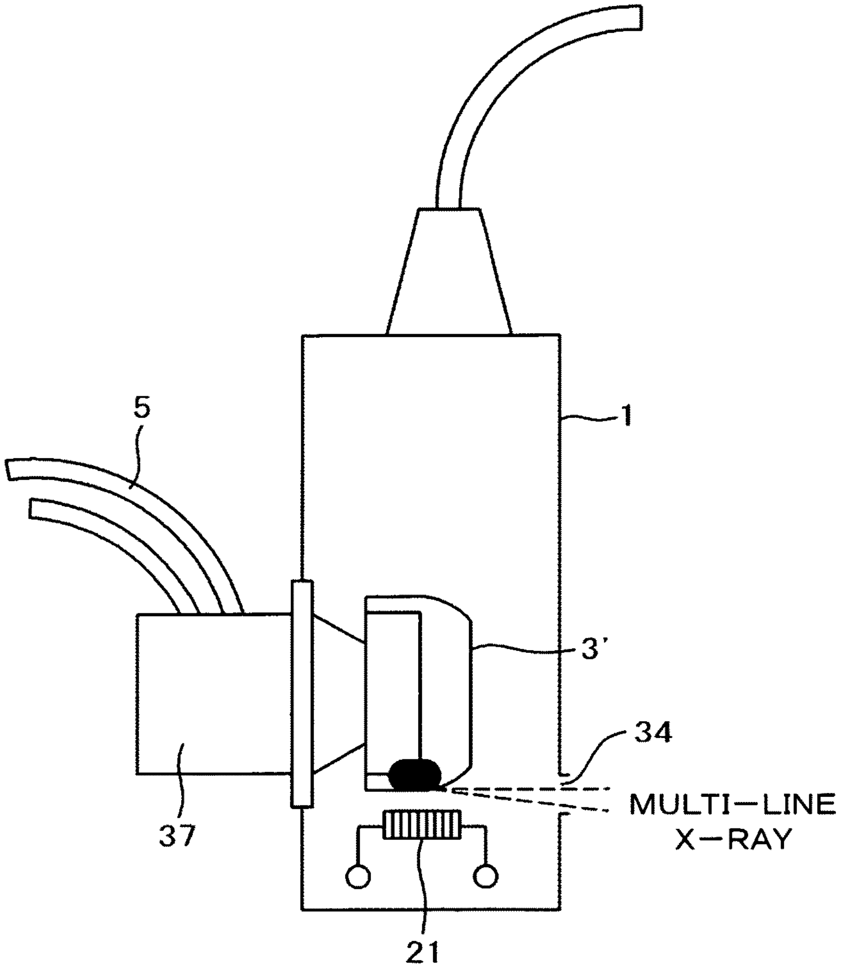
FIG. 9 is a side view for showing the entire structures of the X-ray generating apparatus (of an embodiment 2) having a rotary target, applying the multi-line target mentioned above therein.
Figure 10:
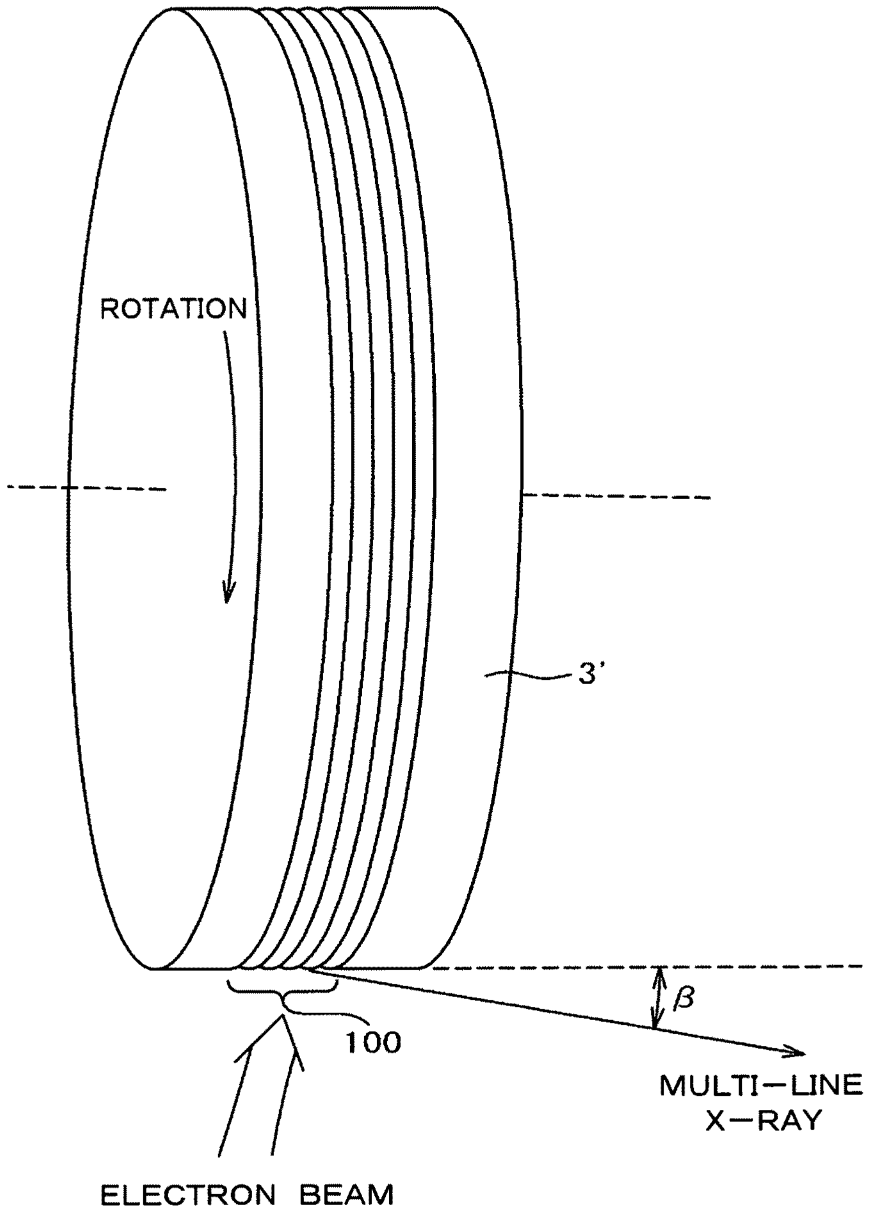
FIG. 10 is a partial enlarged perspective view for showing the structures of peripheries of the rotary target, within the X-ray generating apparatus shown in FIG. 8 mentioned above.

FIG. 9 attached herewith is a cross-section view for showing the entire of so-called a rotating anode X-ray tube, i.e., being an X-ray generating apparatus having a rotating target (e.g., an anticathode) therein, and FIG. 10 attached herewith is an entire perspective view for showing the details of the rotating metal target thereof.

As is shown in FIG. 9, the X-ray generating apparatus having the rotating target (the anticathode) comprises a rotating anode (e.g., the target) 3', which is provided together with a filament 21, as being the electron source 2, within an inside of the X-ray tube body 1 made of stainless steel, being constructed to be vacuum within an inside thereof. Also, a reference numeral 36 in the figure depicts a driver portion, which comprises a means therein, for rotating/driving the rotating target, such as, an electric motor, etc., the detailed structure of which will be explained below, and to that driver portion 36 is also guided the coolant 5; although not shown in the figure, herein, but a pipe or a conduit for cooling that rotating target is provided within the inside thereof. Further, with the structures of others, although the details thereof will not shown in the figure; but they are similar to those shown in FIG. 4 mentioned above, and therefore the explanation thereof will be omitted herein.

And, as is shown in FIG. 10, the rotating anode (the target) 3' has a cylindrical outer configuration, and on an outer peripheral surface thereof are formed the multi-line target 100 mentioned above. Further, this rotating target 3' rotates at high-speed in the direction of an arrow shown in the figure, and the thermal electrons (e.g., the electron beam) emitting from the filament 21, which is provided below that, irradiate on the outer peripheral surface of a lower side of the rotating target 3', under the predetermined condition mentioned above. As a result thereof, the X-ray generating from the surface of the metal target 3', building up the line-like target 100 mentioned above, at the extraction angle (β), is emitted into the direction of the extraction window 34 for the X-ray. Thus, the stripe-like X-rays (the multi-line X-ray) mentioned above can be taken out from the X-ray generating apparatus (the rotating anode X-ray tube).

In this manner, also with the X-ray generating apparatus (the rotating anode X-ray tube) having the rotating target, according to the embodiment 2 mentioned above, it is possible to obtain easily, the plural numbers of stripe-like X-rays (the multi-line X-ray), each having a desired size (i.e., the line width) in μm order, by determining the width (W) and/or the pitch (distance: D) of the line-like member, and the metal for forming the multi-line target mentioned above, as well, and further the extraction angle (β), appropriately. Furthermore, according to this embodiment 2, with provision of the rotating target, since the electron beams hit always upon the target surface, which is cooled, therefore it is possible to obtain, in particular, the multi-line X-ray of high-output, easily, and also, since high-speed rotation of the target prevents the peak width of the multi-line X-ray from being widen, which can be obtained with removing vibration or wobbling of the target surface, thereby possible to obtain the multi-line X-ray of high contrast.

Following to the above will be mentioned about a method for manufacturing the multi-like target 100 mentioned above. For example, it can be considered to apply a diamond cutter machining with using a diamond tool (bit), or a wire spark machining. In particular, an example of the cross-surface of the groove, which can be obtained through the diamond cutter machining, is shown in FIG. 3A mentioned above, or an example of the cross-surface of the groove, which can be obtained through the wire spark machining, is shown in FIG. 4A, respectively. However, judging from the results, which are obtained by conducting the machining, actually, since a convex portion can be shaped preferably, in particular, on the corners thereof, when machining the grooves with applying the wire spark machining, but rather than applying the diamond cutter machining, and also since the multi-line X-ray obtained is high in the contrast thereof (for example, 20:1), confirmation can be made that it is preferable to apply the wire spark machining.

Following to the above, explanation will be made on an example of the principle of an inspection apparatus with applying the multi-line X-ray therein, which can be obtained from the X-ray generating apparatus mentioned above, by referring to FIG. 11 attached herewith.

The pitch (the distance) of the grating (the diffraction grating) is variable or changeable depending on the way of use thereof. For example, when the wavelength of a light source to be applied comes to be short, from 1 nm to 0.1 nm in the wavelength of X-ray, then an estimation of the pitch (the distance) of that grating (in particular, a transmission-type primary grating) must be done in accordance with a special method. Conventionally, the estimation of those pitches (the distances) is conducted with using an atomic force microscope (AFM) or a wavelength (Critical Dimension) scanning electron microscope (CD-SEM).

However, for estimating the pitch (the distance) of the grating corresponding to the X-ray wavelength, the inventors of the present invention found out that it can be achieved with using a simple device, if applying hard X-ray, the wavelength of which is sufficiently short comparing to the pitch (the distance) of the grating.

Figure 11:
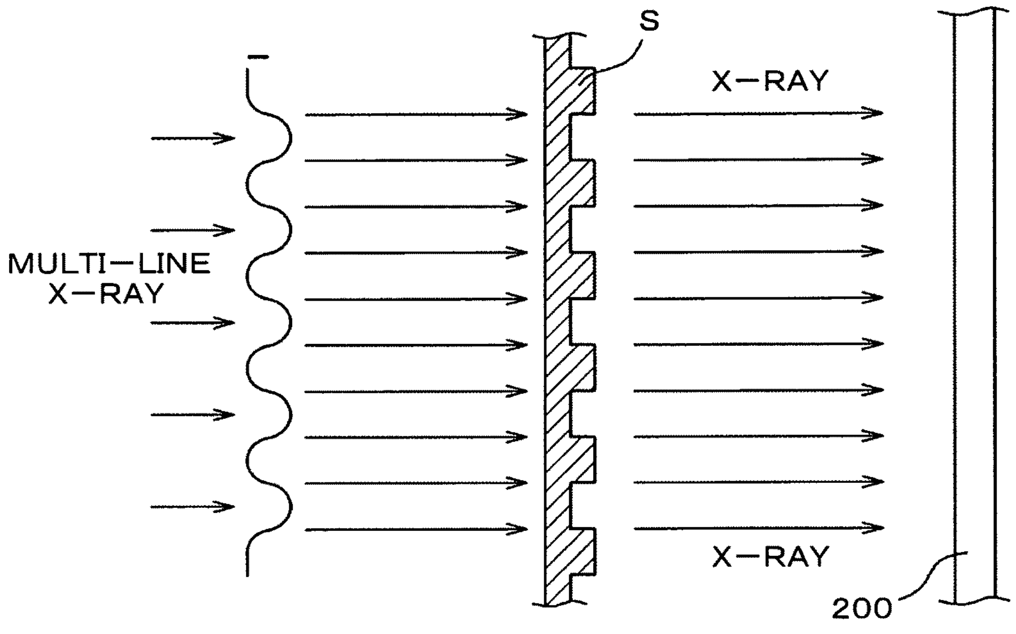
FIG. 11 is a view for showing an example of the principle/structures of an inspection apparatus applying a multi-line X-ray therein, which can be obtained from the X-ray generating apparatus mentioned above according to the present invention.

Then, the inventors of the present invention manufacture an inspection apparatus as shown in FIG. 11 attached herewith. Thus, FIG. 11 is the cross-section view for showing the structure/principle of the inspection apparatus for the grating (the diffraction grating), wherein the multi-like X-ray emitting from the left-hand side in the figure, which can be obtained from the X-ray generating apparatus mentioned above, is irradiated upon the transmission-type primary grating, for example, being an object (e.g., a sample) S of the inspection (or, the estimation). Thereafter, an image of the X-ray, which can be obtained from the object (the sample) mentioned above, is detected by a 2-dimensional detector, such as, an X-ray detector, an X-ray film or the like, or a 1-dimensional detector, such as, an X-ray CCD or the like, for example (hereinafter, an "X-ray detector 200").

However, the estimation is conducted upon basis of the image, which is detected by the X-ray detector 200 mentioned above. However, at that instance, it is preferable to make such an adjustment that the wavelength of the X-ray irradiated thereon is very short, comparing to the pitch (the distance) of the grating, and the multi-line X-ray, and that the multi-line X-ray from the X-ray generating apparatus, i.e., the pitch (the distance) between the plural numbers of lines (e.g., the stripes) thereof is nearly equal to the pitch (the distance) of the grating, being the sample S to be inspected. Thus, as was mentioned above, according to the X-ray generating apparatus mentioned above, it is possible to obtain the multi-line X-ray having the desired wavelength or the pitch (the distance), easily, by determining by determining the width (W) and/or the pitch (distance: D) of the line-like member, and the metal for forming the multi-line target mentioned above, as well, and further the extraction angle (β), appropriately, and thereby enabling to achieve it, fully, even with using a simple apparatus.

Figure 12:
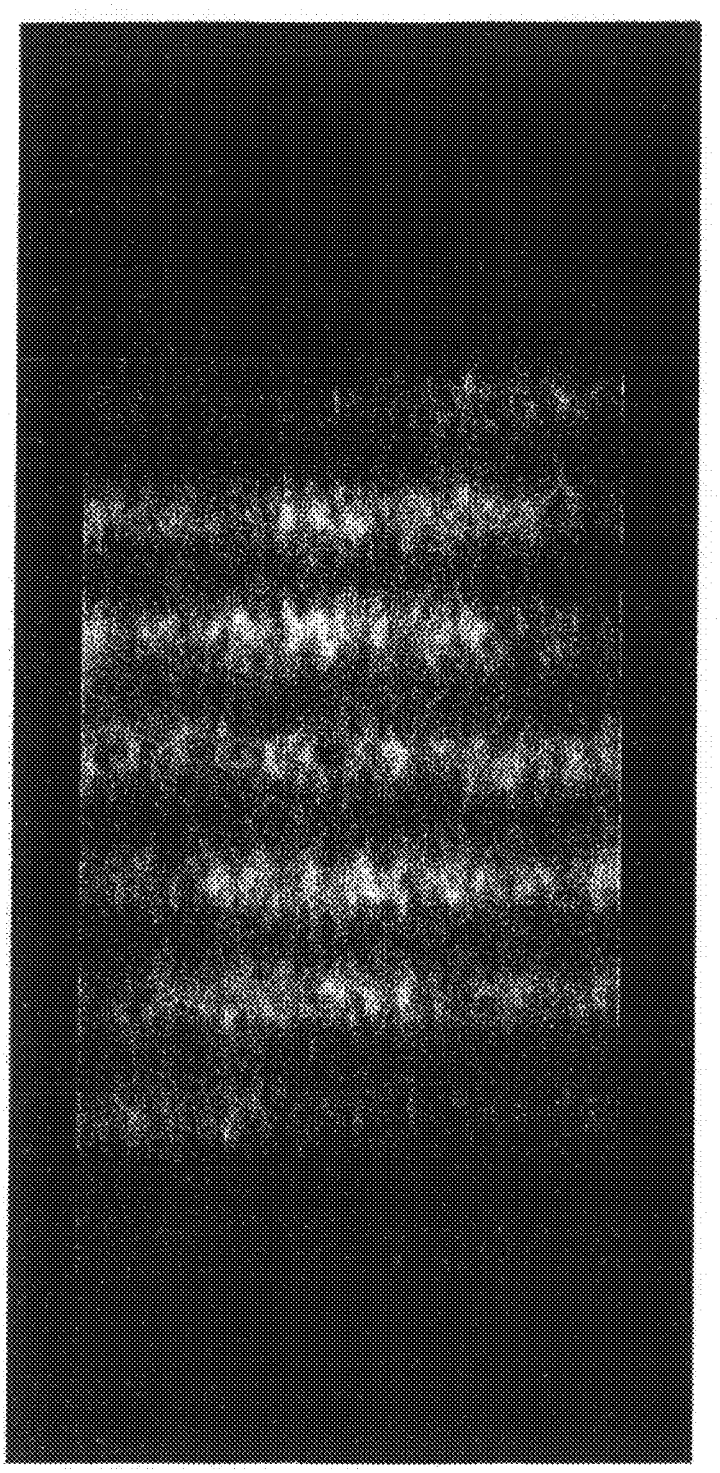
FIG. 12 is a photographic view for showing a result of observation of an actual X-ray image on a surface of the multi-line target, which can be obtained by the X-ray generating apparatus (of the embodiment 2), according to the present invention mentioned above.

Furthermore, FIG. 12 attached herewith shows a result of photographing the X-ray image upon the targets of the multi-line target, according to the embodiment 2 mentioned above, being taken by an X-ray pinhole camera, which is disposed in the direction at the extraction angle) (β=6°). Thus this means that an actual X-ray image on the surface of the multi-line target is observed. And, from this figure, it can be seen that the multi-line target having high contrast ratio can be achieved therein.

EXPLANATION OF MARKS

1 . . . body of X-ray tube, 2 . . . electron source, 3 . . . anode, 4 . . . high-voltage electric power source, 11 . . . X-ray generating apparatus, 21 . . . filament, 22 . . . electron lens, 23 . . . electron beam, 24 . . . electron beam irradiation portion, 25 . . . position change of electron beam, 31 . . . target member, 3*a* . . . base member, 3*b* . . . metal target, 36 . . . heat conductive ceramics, 41 . . . filament power source, 42 . . . bias power source, S . . . sample, 100 . . . multi-line target, 110 . . . groove, 11U . . . line-like target, 200 . . . X-ray detector.

What is claimed is:

1. An X-ray generating apparatus, comprising:

a tube body, which is constructed to be vacuum in an inside thereof;

an electron source, which is provided within said tube body to generate an electron beam therefrom;

a target, which is provided within said tube body and irradiated with the electron beam emitting from said electron source, thereby to generate an X-ray therefrom; and an X-ray window, which is provided for taking out the X-ray generated into an outside of said tube body, wherein on a surface of a member building up said target are formed plural numbers of grooves, each having fine width, repetitively, thereby irradiating the electron beam from said electron source, inclining by a predetermined angle, from a direction perpendicular to an elongating direction of said grooves, so that they bridge over said plural numbers of grooves, and also a multi-line X-ray generating from the plural numbers of multi-line targets, which are formed between said grooves, emits at a predetermined extraction angle, passing through said X-ray window, said predetermined extraction angle is such an angle that is covers over portions, upon which said electron beams irradiate directly, among a surface forming said grooves thereon.

2. The X-ray generating apparatus, described in the claim 1, wherein a member made of an element, an atomic number of which is lower than that of an element making up said target, is filled up within an inside of said grooves.

3. The X-ray generating apparatus, described in the claim 1, wherein a member made of an element, an atomic number of which is lower than that of an element making up said target, is coated on interior surfaces of said grooves.

4. The X-ray generating apparatus, described in the claim 1, wherein said target is a static-type target.

5. The X-ray generating apparatus, described in the claim 1, wherein said target is a rotary-type target.

6. An inspection apparatus, comprising:

an X-ray generating apparatus, which is described in the claim 1; and an X-ray detecting means for detecting an X-ray image, said X-ray image is obtainable by irradiating the multi-line X-ray emitted from said X-ray generating apparatus, upon an inspection object.

7. The inspection apparatus, described in the claim 6, wherein said inspection object is a transmission-type 1-dimensional grating.

* * * * *